(12) United States Patent
Fröhlich et al.

(10) Patent No.: US 11,588,370 B2
(45) Date of Patent: Feb. 21, 2023

(54) TRANSMISSION WITH INTEGRATED ELECTRIC MACHINE

(71) Applicant: Vitesco Technologies GMBH, Hannover (DE)

(72) Inventors: Holger Fröhlich, Berlin (DE); Isao Fukumoto, Berlin (DE)

(73) Assignee: VITESCO TECHNOLOGIES GMBH, Hannover (DE)

( * ) Notice: Subject to any disclaimer, the term of this patent is extended or adjusted under 35 U.S.C. 154(b) by 220 days.

(21) Appl. No.: 16/846,638

(22) Filed: Apr. 13, 2020

(65) Prior Publication Data

US 2020/0244138 A1 Jul. 30, 2020

Related U.S. Application Data

(63) Continuation of application No. PCT/EP2018/074743, filed on Sep. 13, 2018.

(30) Foreign Application Priority Data

Oct. 13, 2017 (DE) ..................... 10 2017 218 350.0

(51) Int. Cl.
*H02K 5/173* (2006.01)
*H02K 7/00* (2006.01)
*F16H 57/02* (2012.01)
*H02K 11/20* (2016.01)
*B60K 6/36* (2007.10)
*B60K 6/38* (2007.10)
(Continued)

(52) U.S. Cl.
CPC ............. *H02K 5/1737* (2013.01); *B60K 6/36* (2013.01); *B60K 6/38* (2013.01); *F16H 3/006* (2013.01); *F16H 57/02* (2013.01); *H02K 7/006* (2013.01); *H02K 7/10* (2013.01); *H02K 11/20* (2016.01); *B60Y 2200/92* (2013.01); *F16H 2057/02034* (2013.01)

(58) Field of Classification Search
CPC ....... H02K 5/1737; H02K 7/006; F16H 57/02
USPC ......................................................... 74/661
See application file for complete search history.

(56) References Cited

U.S. PATENT DOCUMENTS 7,942,245 B2   5/2011  Shimizu et al.
8,013,483 B2   9/2011  Suzuki et al.
(Continued)

FOREIGN PATENT DOCUMENTS

CN   102472271 A   5/2012
CN   105656246 A   6/2016
(Continued)

OTHER PUBLICATIONS

Chinese Office Action dated Sep. 3, 2021 for corresponding Chinese Patent Application No. 201880064169.X.
(Continued)

*Primary Examiner* — Ha Dinh Ho

(57) ABSTRACT

An electric machine for arrangement in a transmission housing, having an adapter device, an axle connected to the adapter device, a rotor arranged on the axle by a bearing device so as to be rotatable about the axle, and a stator which surrounds the rotor in a circumferential direction and which is arrangeable spaced apart from the rotor, and at least partially fixable, in the adapter device, wherein the adapter device partially covers the rotor and/or the stator.

14 Claims, 2 Drawing Sheets

(51) Int. Cl.
*F16H 3/00* (2006.01)
*H02K 7/10* (2006.01)

(56) References Cited

U.S. PATENT DOCUMENTS

| | | | |
|---|---|---|---|
| 8,925,662 B2* | 1/2015 | Han | H02K 7/14 |
| | | | 180/65.6 |
| 9,441,628 B2 | 9/2016 | Sakata et al. | |
| 9,713,955 B2 | 7/2017 | Kanada et al. | |
| 10,355,556 B2* | 7/2019 | Komi | H02K 7/006 |
| 10,518,622 B1* | 12/2019 | Chang | B62M 7/12 |
| 10,538,238 B2* | 1/2020 | Swales | B60K 6/485 |
| 2004/0084979 A1* | 5/2004 | Hughes | F16D 48/06 |
| | | | 310/78 |
| 2009/0025991 A1* | 1/2009 | Moriguchi | H02K 7/102 |
| | | | 180/65.51 |
| 2010/0180720 A1 | 7/2010 | Kempf et al. | |
| 2013/0009450 A1* | 1/2013 | Suzuki | H02K 7/116 |
| | | | 301/6.5 |
| 2013/0307320 A1* | 11/2013 | Akamatsu | B60L 7/14 |
| | | | 301/6.5 |
| 2015/0038277 A1 | 2/2015 | Tamura | |
| 2015/0211583 A1 | 7/2015 | Lebal et al. | |
| 2017/0040872 A1 | 2/2017 | Nitsch et al. | |
| 2018/0162355 A1* | 6/2018 | Colavincenzo | B60K 6/48 |

FOREIGN PATENT DOCUMENTS

| | | |
|---|---|---|
| CN | 106165263 A | 11/2016 |
| CN | 106357074 A | 1/2017 |
| DE | 10026467 A1 | 12/2001 |
| DE | 102004004617 A1 | 9/2005 |
| DE | 10201216130 | 1/2013 |
| DE | 102011079158 A1 | 1/2013 |
| DE | 102011081659 A1 | 1/2013 |
| DE | 102013219870 A1 | 5/2014 |
| DE | 102015012223 A1 | 4/2016 |
| DE | 102014224476 A1 | 6/2016 |
| EP | 1112884 A1 | 7/2001 |
| FR | 965860 A | 9/1950 |
| WO | 2010108532 A2 | 9/2010 |
| WO | 2013176107 A1 | 11/2013 |

OTHER PUBLICATIONS

International Search Report and Written Opinion dated Dec. 21, 2018 from corresponding International Patent Application No. PCT/EP2018/074743.
German Office Action dated Jul. 4, 2018 for corresponding German Patent Application No. 10 2017 218 350.0.
Chinese Office Action dated Jun. 13, 2022 for corresponding Chinese patent application No. 201880064169.X.

* cited by examiner

TRANSMISSION WITH INTEGRATED ELECTRIC MACHINE

CROSS-REFERENCE TO RELATED APPLICATIONS

This application claims priority to PCT Application PCT/EP2018/074743, filed Sep. 13, 2018, which claims priority to German Patent Application No. DE 10 2017 218 350.0, filed Oct. 13, 2017. The disclosures of the above applications are incorporated herein by reference.

FIELD OF THE INVENTION

The invention relates to an electric machine for arrangement in a transmission housing, a transmission arrangement with a transmission housing and the electric machine according to the invention arranged in the transmission housing, and a hybrid vehicle with the transmission arrangement according to the invention.

BACKGROUND OF THE INVENTION

In the field of motor vehicles, in particular in the field of passenger cars, there is a trend toward hybrid vehicles which, in addition to an internal combustion engine, also have an electric drive. Thus, if the motor vehicle is driven by the electric drive, the $CO_2$ emissions can preferably be reduced.

It is also known that hybrid vehicles of this type can have a torque-split hybrid drivetrain composed of a double clutch transmission, to which an electric machine is coupled, and of power electronics. Here, the power electronics constitute the link between a battery and the electric machine. The known torque-split hybrid drivetrain is thus composed of several modules, in particular a double clutch transmission and an electric machine, which are coupled to one another. A disadvantage here is that the respective modules have their own housing, as a result of which the hybrid drivetrain can have an increased weight and an increased installation space. In addition, if cooling is required, each module requires its own cooling circuit.

There is a regular need to optimize the drivetrain of motor vehicles in order to reduce the weight and/or the installation space. The fuel and/or energy consumption of the motor vehicle can preferably be reduced by reducing the weight.

SUMMARY OF THE INVENTION

It is the object of the present invention to provide an electric machine which may have a reduced installation space and a reduced weight.

This object is achieved by the subject matter described herein. Advantageous refinements of the invention are also described herein, where each feature may constitute an aspect of the invention both individually and in combination. Here, all combinations as well as isolated combinations between the features of the electric machine, of the transmission arrangement and/or of the hybrid vehicle may be utilized together. Furthermore, in each case, provision is also made, and it is possible, for individual or multiple features of the electric machine, of the transmission arrangement and/or of the hybrid vehicle to be combined with one another as desired.

According to the invention, an electric machine for arrangement in a transmission housing is provided, having an adapter device, an axle connected to the adapter device, a rotor arranged on the axle by a bearing device so as to be rotatable about the axle, and a stator which surrounds the rotor in a circumferential direction and which is arrangeable spaced apart from the rotor, and at least partially fixable, in the adapter device, wherein the adapter device partially covers the rotor and/or the stator.

It is therefore an aspect of the invention that the electric machine has an adapter device and an axle, the axle preferably being connected in a rotationally fixed manner to the adapter device. The axle therefore does not rotate. A rotor is arranged on the axle, which rotor is designed to be rotatable about the axle by using a bearing device arranged between the rotor and the axle. A stator is arranged in a circumferential direction of the rotor and spaced apart from the rotor. The stator is connected to the adapter device so as to be at least partially held by the adapter device. The adapter device partially covers the rotor and/or the stator. In general, the adapter unit partially covers both the rotor and the stator. The adapter device may therefore be regarded as a partial housing of the electric machine which surrounds the rotor and the stator only partially and therefore not completely, wherein the adapter device bears the stator and the rotor is, by the axle connected to the adapter device, mounted so as to be rotatable about the axle.

In this way, an electric machine is provided which is easily arranged in and connected to a transmission housing. Because the electric machine has only a partial housing, the weight and the installation space of the electric machine is reduced. If the electric machine is arranged in a transmission arrangement or in a transmission housing, the installation space of the transmission arrangement and thus its weight is reduced in this way.

Furthermore, the mass moment of inertia and the weight of the rotor is reduced by the mounting of the rotor on the axle of the adapter unit. With a reduction in the rotor mass, greater dynamics of the electric machine is achieved owing to the lower mass moment of inertia.

The electric machine is a permanent-magnet synchronous machine, which has a high-speed concept, whereby the power density is increased.

An advantageous refinement of the invention consists in that the axle is guided through the adapter device and is connected to the latter in a non-positively locking, positively locking and/or cohesive manner. A positively locking connection, for example by interlocking projections and/or recesses which are formed on the axle and in the adapter device, constitutes a simple and inexpensive possibility for a rotationally fixed connection of the axle to the adapter device. The cohesive connection may preferably be a welded connection, a soldered connection and/or an adhesive connection, by which the axle is connected in a rotationally fixed manner to the adapter device. The separate form of the axle and adapter unit may be advantageous if different materials are to be used for the axle and for the adapter unit. It may also be simpler in terms of production to manufacture the axle and the adapter device separately and to subsequently connect them to one another.

As an alternative to the multi-part form of the axle and adapter device, it is conceivable for the adapter device and the axle to be formed as a single piece. The variety of parts is reduced by the single-piece form of the adapter device and axle. In addition, the working step of connecting the axle and adapter device is eliminated, whereby the production process is accelerated and the production costs may be reduced.

In one advantageous refinement of the invention, provision is made whereby the adapter device has, on an inner side facing toward the rotor, a projection which surrounds the axle at least in certain portions. By the projection, bearing device arranged on the axle is fixed in the axial direction at least in one direction. The projection is thus preferably designed as a stop element for the bearing device.

In this context, a preferred refinement of the invention consists in that the projection is of frustoconical form, and the frustum is designed to taper with increasing distance from the adapter device. In this way, the weight of the adapter device and thus of the electric machine is reduced by the cross-section-reducing profile of the projection.

An advantageous refinement of the invention consists in that the adapter device has, on the inner side, an at least partially encircling upstanding portion with a first recess for receiving the stator. The upstanding portion is preferably of circular-ring-shaped form, wherein the circular ring may be of closed or else interrupted form. If the circular ring is of interrupted form, the weight of the adapter device and thus of the electric machine is reduced. The recess is preferably formed as a fold, such as an encircling fold, in the upstanding portion. The stator may thus engage at least in certain portions into the fold, as a result of which the latter may be mounted in the radial direction and at least in one direction axially.

According to a preferred refinement of the invention, provision is made whereby the rotor has a rotor carrier with at least one laminated core arranged on the rotor carrier, wherein the rotor carrier has a cavity which is formed in an axial direction of the rotor carrier and which includes, on a first rotor carrier face side facing toward the adapter device, a receiving opening for receiving the axle and the bearing device. In this way, the rotor is of multi-part form and includes at least the rotor carrier and the laminated core arranged on the rotor carrier.

One advantageous refinement of the invention consists in that the bearing device includes a first bearing ring and a second bearing ring, the first bearing ring and the second bearing ring are arranged on the axle, and an inner lateral surface of the cavity has a first bearing seat, with a first stop for receiving and positionally fixing the first bearing ring in the axial direction, and a second bearing seat, with a second stop for receiving and positionally fixing the second bearing ring in the axial direction. In this way, in a first step, the first bearing ring and the second bearing ring are arranged in the respective bearing seat, whereby they are positioned in the axial direction of the rotor carrier by the respective stop. In a second step, the axle is introduced into the cavity via the receiving opening and inserted through the bearing rings, such that the rotor is rotatably mounted on the axle. In connection with the projection surrounding the axle, it is possible here for the second bearing ring to be fixed in the axial direction of the rotor and to be designed as a fixed bearing. The second bearing ring is consequently fixed or clamped between the second stop and the projection in the axial direction. The first bearing ring is preferably designed as a floating bearing in the first bearing seat. In this way, the risk of mutual distortion of the bearing rings is reduced.

In principle, that section of the axle which projects into the cavity may have only one axle diameter. One advantageous refinement of the invention consists in that that portion of the axle which projects into the cavity has a first axle diameter and a second axle diameter which differs from the first axle diameter, wherein the portion of the second axle diameter is formed between the portion of the first axle diameter and the adapter device, and the second axle diameter is larger than the first axle diameter, wherein the first bearing ring is arranged on the first axle diameter and the second bearing ring is arranged on the second axle diameter.

The axle may thus have at least two sections with different axle diameters. Because of the different axle diameters, it is for example possible for the radial spacing between the axle and the first bearing seat formed on the inner lateral surface and the radial spacing between the axle and the second bearing seat formed on the inner lateral surface to be configured to be identical. The mass moment of inertia of the rotor together with the bearing device may thus be reduced.

One advantageous refinement of the invention consists in that the rotor carrier has, on a second rotor carrier face side facing away from the adapter device, a shaft journal which is coupled to a transmission input shaft. In this context, provision is advantageously made whereby the shaft journal and the transmission input shaft are couplable to one another in positively locking fashion by the use of a plug-in coupling. Preferably, as the electric machine is introduced into the transmission housing of a transmission arrangement, the plug-in coupling of the shaft journal may engage into a corresponding plug-in receptacle of the transmission input shaft. In this way, the electric machine is coupled in a simple manner to the transmission input shaft in order to transmit a rotational movement of the electric machine, such as of the rotor, to the transmission input shaft. The assembly effort and the manufacturing costs of a transmission arrangement with the integrated electric machine may thus be reduced.

In one advantageous refinement of the invention, provision is made whereby the rotor carrier has a cooling channel with an inlet opening and at least one outlet opening. In this context, one advantageous refinement of the invention consists in that the inlet opening is formed on a shaft journal face side of the shaft journal, and the at least one outlet opening is formed on an outer lateral surface of the rotor carrier adjacent to the laminated core which is arranged on the rotor carrier, and/or on the first rotor carrier face side facing toward the adapter device. Thus, a rotor carrier with a cooling channel is provided, in the case of which a cooling medium is fed to the rotor carrier via the shaft journal face side, wherein the cooling medium is guided through the rotor carrier in order to cool the latter. Under the influence of centrifugal force as a result of a rotation of the rotor, the cooling medium is centrifuged out of the rotor carrier via the outlet opening, in order to thereby preferably cool end windings of the stator surrounding the rotor.

One advantageous refinement of the invention consists in that a sensor magnet or a magnetic field sensor is formed on an axle face side, facing away from the adapter device, of the axle, and the respective other sensor is formed on a head side, facing toward the axle face side, of the rotor carrier. In an embodiment, the sensor magnet is connected to the rotor or the rotor carrier and correspondingly arranged on the head side of the rotor carrier, and for the magnetic field sensor to be formed on the axle face side. When the rotor rotates, the sensor magnet thus has the same rotational speed as the rotor. A periodically changing magnetic field of the rotating sensor magnet is detected by the magnetic field sensor, from which the angle of rotation, the rotational speed, a change in the angle of rotation position and/or in the rotational speed and the direction of rotation of the rotor is determined in a simple manner.

The invention also relates to a transmission arrangement for a hybrid vehicle, including a transmission, preferably a double clutch transmission, with a transmission housing encasing the transmission, wherein the transmission housing has a wall projection for receiving the electric machine according to the invention, and the wall projection is connectable to the adapter device such that the rotor and the stator are housed by the transmission housing and/or the wall projection and the adapter device.

It is therefore an aspect of the invention that the rotor and the stator are housed by the partial housing, specifically the adapter device, and the wall projection and/or the transmission housing. Because the electric machine does not have its own housing surrounding the rotor and the stator, the weight and the installation space of the transmission arrangement is reduced.

Owing to its construction, the integrated electric machine may have great advantages over other modular concepts. An axially parallel arrangement of the electric machine with respect to the transmission makes it possible to select different transmission ratios in the connection to the transmission and thus to implement high-speed concepts and realize simple decoupling from the mechanical drivetrain. This may optimize the operating points for the engine and increase its service life. In addition, a significantly smaller high-speed electric machine is used, which is lighter and less expensive and does not change, or only slightly changes, the installation space length of the transmission arrangement.

One advantageous refinement of the invention consists in that the wall projection has, at least in certain portions, a second recess for receiving the stator. In this way, the stator may preferably be clamped in the axial direction between the first recess of the adapter device and the second recess of the wall projection and thus fixed in the axial direction. The first recess and the second recess are preferably each formed as an encircling fold, such that the stator engaging in the first recess and the second recess is fixed in the radial direction. In this way, secure fixing of the stator in position is provided.

Finally, the invention relates to a hybrid vehicle having the transmission arrangement according to the invention.

Further features and advantages of the present invention will emerge from the exemplary embodiments. The exemplary embodiments are to be understood not as restrictive, but rather as examples. They are intended to enable a person skilled in the art to carry out the invention. The applicant reserves the right to make one or more of the features disclosed in the exemplary embodiments.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The exemplary embodiments will be discussed in more detail with reference to figures, in which.

DETAILED DESCRIPTION OF THE PREFERRED EMBODIMENTS

The following description of the preferred embodiment(s) is merely exemplary in nature and is in no way intended to limit the invention, its application, or uses.

Figure 1:
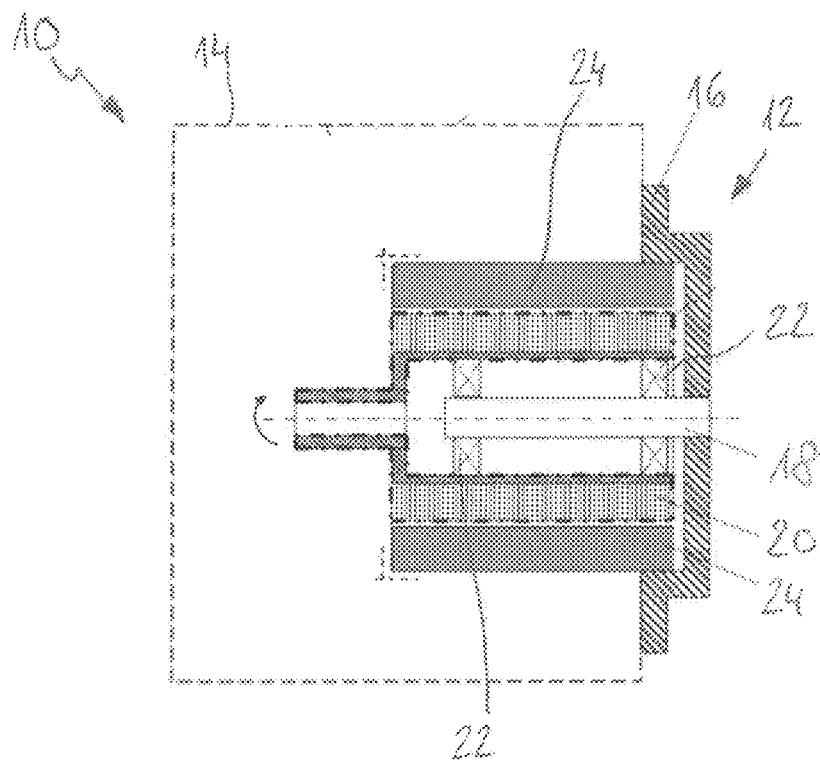
FIG. 1 shows a schematic sectional illustration of a transmission arrangement with an integrated electric machine.

FIG. 1 shows a schematic longitudinal section through a transmission arrangement 10 with an integrated electric machine 12. The transmission arrangement 10 includes a transmission housing 14 of a transmission (not shown), into which transmission housing the electric machine 12 at least partially engages.

The electric machine 12 has an adapter device 16 and an axle 18 connected in a rotationally fixed manner to the adapter device 16. The axle 18 is thus connected fixedly, such as in positively locking and/or cohesive fashion, to the adapter device 16. A rotor 20 is arranged on the axle 18 and is designed to be rotatable about the axle 18 through the use of a bearing device 22 arranged between the rotor 20 and the axle 18. A stator 24 is arranged in a circumferential direction of the rotor 20 and so as to be spaced apart from the rotor 20. The stator 24 is connected to the adapter device 16, such that the stator is at least partially held and/or fixed in position by the adapter device 16. The adapter device 16 partially covers the rotor 20 and the stator 24. The adapter device 16 may therefore be regarded as a partial housing of the electric machine 12, which surrounds the rotor 20 and the stator 24 partially and therefore not completely. The adapter device 16 designed as a partial housing bears the stator 24 and the rotor 20, the latter being mounted by the axle 18 connected to the adapter device 16, rotatably about the longitudinal direction of the axle.

The electric machine 12 engages at least partially in the transmission housing 14, wherein the adapter device 16 is connected to the transmission housing 14 such that the rotor 20 and the stator 24 are enclosed by the transmission housing 14 and the adapter device 16.

In this way, an electric machine 12 is provided which is easily arranged in and connected to the transmission housing 14. Because the electric machine 12 has only a partial housing, the weight and the installation space of the electric machine 12 is reduced. If the electric machine 12 is arranged in the transmission arrangement 10 or in the transmission housing 14, the installation space of the transmission arrangement 10 and thus its weight is reduced in this way.

Figure 2:
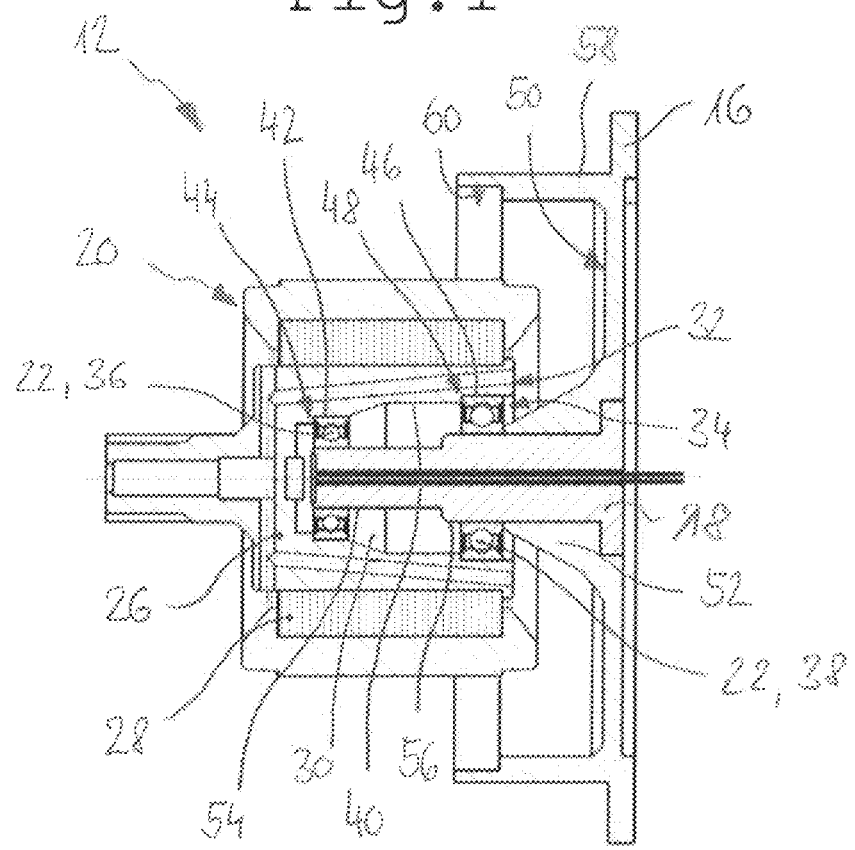
FIG. 2 shows a longitudinal section through the electric machine.

FIG. 2 shows a longitudinal section through the electric machine 12. The rotor 20 has a rotor carrier 26 with at least one laminated core 28 arranged on the rotor carrier 26. The rotor carrier 26 has a cavity 30 which is formed in an axial direction of the rotor carrier 26 and which has, on a first rotor carrier face side 32 facing toward the adapter device 16, a receiving opening 34 for receiving the axle 18 and the bearing device 22.

The bearing device 22 includes a first bearing ring 36 and a second bearing ring 38, wherein the first bearing ring 36 and the second bearing ring 38 are each arranged on the axle 18. An inner lateral surface 40 of the cavity 30 forms a first bearing seat 42 with a first stop 44 for receiving the first bearing ring 36, and fixing the latter in position, in the axial direction. Furthermore, the inner lateral surface 40 forms a second bearing seat 46 with a second stop 48 for receiving the second bearing ring 38 and fixing the latter in position. In this way, in a first step, the first bearing ring 36 and the second bearing ring 38 are arranged in the respective bearing seat 42, 46, whereby they are positioned in the axial direction of the rotor carrier 26 by the respective stop 44, 48.

On an inner side 50 facing toward the rotor 20, the adapter device 16 has a projection 52 which surrounds the axle 18 at least in certain portions. In the present exemplary embodiment, the projection 52 is of frustoconical form, wherein the frustum is designed to taper with increasing distance from the adapter device 16. In this way, the weight of the adapter device 16 and thus of the electric machine 12 are reduced by the cross-section-reducing profile of the projection 52.

In a second step, the axle 18 is introduced into the cavity 30 via the receiving opening 34 and inserted through the bearing rings 36, 38, such that the rotor 20 is rotatably mounted on the axle 18. In connection with the projection 52 surrounding the axle 18, the second bearing ring 38 is fixed in the axial direction of the rotor 20 and is designed as a fixed bearing. The second bearing ring 38 is consequently fixed or clamped between the second stop 48 and the projection 52 in the axial direction. The projection 52 thus forms a stop element for the second bearing ring 38. The first bearing ring 36 is preferably designed as a floating bearing in the first bearing seat 42. In this way, the risk of mutual distortion of the bearing rings 36, 38 is reduced.

Furthermore, it is seen that that portion of the axle 18 which projects into the cavity 30 has a first axle diameter 54 and a second axle diameter 56 which differs from the first axle diameter 54, wherein the portion with the second axle diameter 56 is formed between the portion with the first axle diameter 54 and the adapter device 16. The second axle diameter 56 has a larger axle diameter than the first axle diameter 54. The first bearing ring 36 is arranged on the portion of the first axle diameter 54, and the second bearing ring 38 is mounted on the portion with the second axle diameter 56. Because of the different axle diameters, it is possible for the radial spacing between the axle 18 and the first bearing seat 36 formed on the inner lateral surface 50 and the radial spacing between the axle 18 and the second bearing seat 38 formed on the inner lateral surface 50 to be configured to be identical. The mass moment of inertia of the rotor 20 together with the bearing device 22 may thus be reduced.

Furthermore, the adapter device 16 has, on the inner side 50, an at least partially encircling upstanding portion 58 with a first recess 60 for receiving the stator 24. In the present exemplary embodiment, the upstanding portion 58 is of circular-ring-shaped form, wherein the circular ring is of closed form. The first recess 60 is designed as an encircling fold in the upstanding portion 58. The stator 24 may thus engage at least in certain portions into the fold 60, as a result of which the latter is mounted in the radial direction and in the axial direction.

Figure 3:
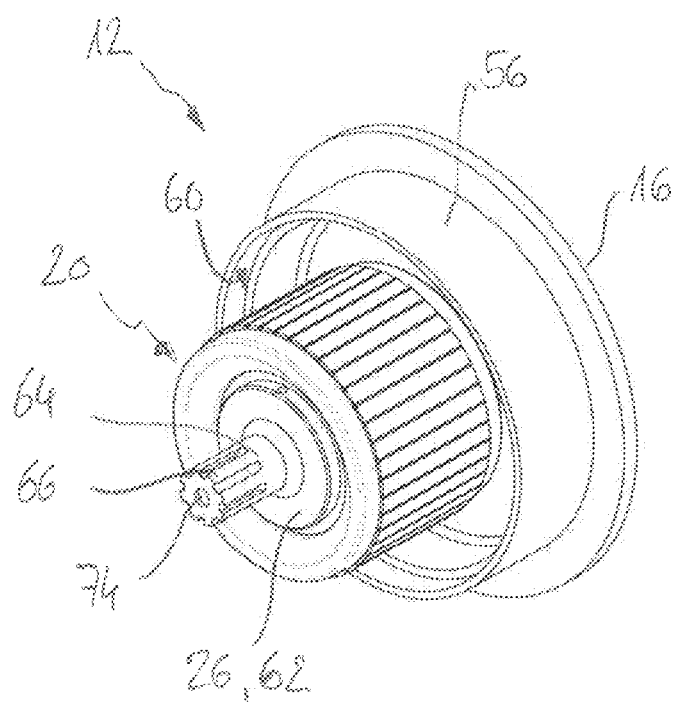
FIG. 3 shows a view of the electric machine.

FIG. 3 shows a view of the electric machine 12. The rotor carrier 26 has a shaft journal 64 on a second rotor carrier face side 62 which faces away from the adapter device 16, which shaft journal is coupled to a transmission input shaft (not shown) of a transmission. For this purpose, the shaft journal 64 and the transmission input shaft each have a plug-in coupling 66, by which the shaft journal 64 and the transmission input shaft are coupled to one another in positively locking fashion. Thus, as the electric machine 12 is introduced into the transmission housing 14 of a transmission arrangement 10, the plug-in coupling 66 of the shaft journal 64 may engage into a corresponding plug-in receptacle of the transmission input shaft. In this way, the electric machine 12 is coupled in a simple manner to the transmission input shaft in order to transmit a rotational movement of the electric machine 12, such as of the rotor 20, to the transmission input shaft. The assembly effort and the manufacturing costs of the transmission arrangement 10 with the integrated electric machine 12 may thus be reduced.

Figure 4:
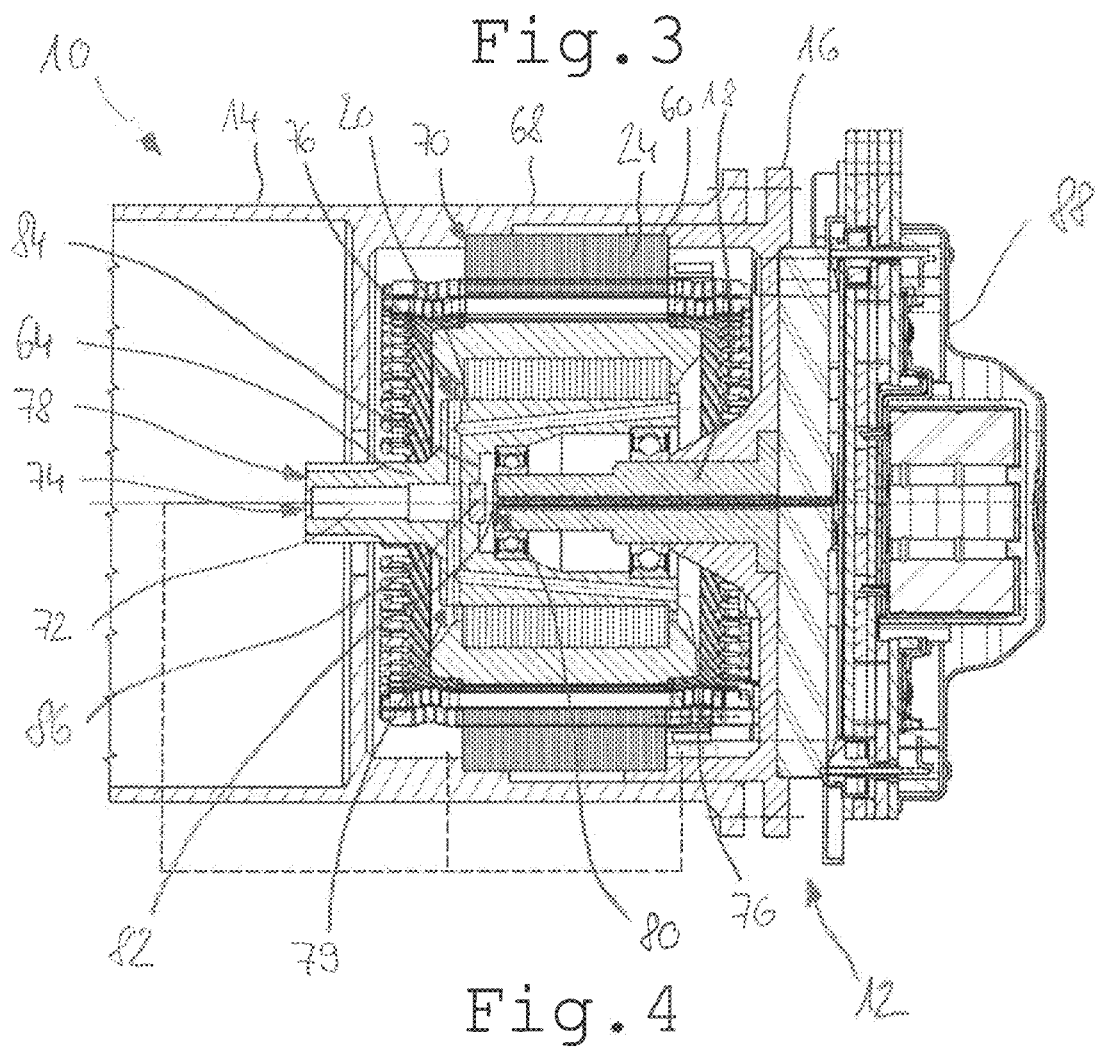
FIG. 4 shows a longitudinal section through the transmission arrangement with the integrated electric machine.

FIG. 4 shows the transmission arrangement 10 in a longitudinal section. The transmission housing 14 has a wall projection 68 for receiving the electric machine 12. The wall projection 68 is connectable to the adapter device 16 preferably by a screw connection, such that the rotor 20 and the stator 24 are housed by the transmission housing 14 and/or the wall projection 68 and the adapter device 16. Thus the electric machine 12 does not require its own housing surrounding the rotor 20 and the stator 24, whereby the weight and the installation space of the transmission arrangement 10 are reduced.

The wall projection 68 has, at least in certain portions, a second recess 70 for receiving the stator 24. In this way, the stator 24 may preferably be clamped in the axial direction between the first recess 60 of the adapter device 16 and the second recess 70 of the wall projection 68 and thus fixed in the axial direction. The first recess 60 and the second recess 70 are each formed as an encircling fold, such that the stator 24 engaging in the first recess 60 and the second recess 70 are fixed in the radial direction and in the axial direction.

Provision is furthermore made whereby the rotor carrier 26 has a cooling channel 72 with an inlet opening 74 and at least one outlet opening 76. The inlet opening 74 is formed on a shaft journal face side 78 of the shaft journal 64. The outlet opening 76 is on an outer lateral surface 79 of the rotor carrier 26 adjacent to the laminated core 28 arranged on the rotor carrier 26. Furthermore, an outlet opening 76 is formed on the first rotor carrier face side 32 facing toward the adapter device 16. Thus, a rotor carrier with a cooling channel 72 is provided, in the case of which a cooling medium is fed to the rotor carrier 26 via the shaft journal face side 78, wherein the cooling medium is guided through the rotor carrier 26 in order to cool the latter. Under the influence of centrifugal force as a result of a rotation of the rotor 20, the cooling medium is centrifuged out of the rotor carrier 26 via the outlet openings 76, and may thereby preferably cool end windings of the stator 24 surrounding the rotor 20. The cooling channel 72 preferably has a radial diameter widening such that the cooling medium is conveyed to the one or more outlet openings 76 by the centrifugal forces of the rotating rotor 20.

Owing to the arrangement of the electric machine 12 integrated in the transmission housing 14, one cooling circuit is used to cool the transmission and the electric machine 12, whereby the costs and the installation space requirement of the cooling circuit are reduced.

A magnetic field sensor 82 is arranged on an axle face side 80, facing away from the adapter device 16, of the axle 18, and a sensor magnet 86 is formed on a head side 84, facing toward the axle face side 80, of the rotor carrier 26. When the rotor 20 rotates, the sensor magnet 86 thus has the same rotational speed as the rotor 20. A periodically changing magnetic field of the rotating sensor magnet 86 is detected by the magnetic field sensor 82, from which the angle of rotation, the rotational speed, a change in the angle of rotation position and/or in the rotational speed and the direction of rotation of the rotor may be determined.

FIG. 14 also shows that the adapter device 16 is the carrier of an inverter 88. The inverter 88 may thus be screwed onto the adapter device 16, such that the adapter device 16 is arranged or formed between the transmission and the inverter 88.

The description of the invention is merely exemplary in nature and, thus, variations that do not depart from the gist of the invention are intended to be within the scope of the invention. Such variations are not to be regarded as a departure from the spirit and scope of the invention.

REFERENCE DESIGNATIONS

10 Transmission arrangement
12 Electric machine

14 Transmission housing
16 Adapter device
18 Axle
20 Rotor
22 Bearing device
24 Stator
26 Rotor carrier
28 Laminated core
30 Cavity
32 First rotor carrier face side
34 Receiving opening
36 First bearing ring
38 Second bearing ring
40 Inner lateral surface
42 First bearing seat
44 First stop
46 Second bearing seat
48 Second stop
50 Inner side
52 Projection
54 First axle diameter
56 Second axle diameter
58 Upstanding portion
60 First recess, fold
62 Second rotor carrier face side
64 Shaft journal
66 Plug-in coupling
68 Wall projection
70 Second recess
72 Cooling channel
74 Inlet opening
76 Outlet opening
78 Shaft journal face side
79 Outer lateral surface of rotor carrier
80 Axle face side
82 Magnetic field sensor
84 Head side
86 Sensor magnet
88 Inverter

What is claimed is:

1. An electric machine for arrangement in a transmission housing, comprising:
 an adapter device;
 an axle connected to the adapter device;
 a rotor arranged on the axle;
 a bearing device arranged between the rotor and the axle, such that the rotor is rotatable about the axle; and
 a stator which surrounds the rotor in a circumferential direction and which is arrangeable spaced apart from the rotor, and at least partially fixable, in the adapter device;
 a rotor carrier;
 at least one laminated core arranged on the rotor carrier;
 a cavity being part of the rotor carrier, the cavity formed in an axial direction of the rotor carrier;
 a receiving opening being part of the rotor carrier, the receiving opening on a first rotor carrier face side facing toward the adapter device, and the receiving opening receives the axle and the bearing device;
 a first bearing ring, the first bearing ring being part of the bearing device;
 a second bearing ring, the second bearing ring being part of the bearing device, and the first bearing ring and the second bearing ring are arranged on the axle;
 an inner lateral surface being part of the cavity;
 a first bearing seat integrally formed as part of the inner lateral surface, the first bearing seat having a first stop for receiving and positionally fixing the first bearing ring in the axial direction; and
 a second bearing seat integrally formed as part of the inner lateral surface the second bearing seat having a second stop for receiving and positionally fixing the second bearing ring in the axial direction;
 wherein the adapter device partially covers at least one of the rotor or the stator.

2. The electric machine of claim 1, wherein the axle is guided through the adapter device and is connected to the adapter device in a non-positively locking manner.

3. The electric machine of claim 1, wherein the axle is guided through the adapter device and is connected to the adapter device in at least one of a positively locking or cohesive manner.

4. The electric machine of claim 1, wherein the adapter device and the axle are formed as a single piece.

5. The electric machine of claim 1, the adapter device further comprising:
 a projection located on an inner side of the adapter device, the projection facing toward the rotor;
 wherein the projection surrounds the axle at least in certain portions.

6. The electric machine of claim 1, the adapter device further comprising:
 a partially encircling upstanding portion on an inner side; and
 a first recess for receiving the stator, the first recess formed as part of he partially encircling upstanding portion.

7. The electric machine of claim 1, the portion of the axle which projects into the cavity further comprising:
 a first axle diameter, the first bearing ring is arranged on the first axle diameter; and
 a second axle diameter, the second bearing ring is arranged on the second axle diameter;
 wherein the second axle diameter differs from the first axle diameter, the second axle diameter is larger than the first axle diameter, and the portion of the second axle diameter is formed between the portion of the first axle diameter and the adapter device.

8. The electric machine of claim 1, the rotor carrier (26) further comprising:
 a shaft journal on a second rotor carrier face side, the shaft journal facing away from the adapter device;
 wherein the shaft journal is coupled to a transmission input shaft.

9. The electric machine of claim 1, the rotor carrier further comprising a cooling channel having an inlet opening and at least one outlet opening.

10. The electric machine of claim 9, wherein the inlet opening is formed on a shaft journal face side of the shaft journal.

11. The electric machine of claim 9, wherein the at least one outlet opening is formed on an outer lateral surface of the rotor carrier adjacent to the laminated core which is arranged on the rotor carrier, or on the first rotor carrier face side facing toward the adapter device.

12. The electric machine of claim 9, wherein the at least one outlet opening is formed on an outer lateral surface of the rotor carrier adjacent to the laminated core which is arranged on the rotor carrier and on the first rotor carrier face side facing toward the adapter device.

13. An electric machine for arrangement in a transmission housing, comprising:
 an adapter device;
 an axle connected to the adapter device;

a rotor arranged on the axle;
a bearing device arranged between the rotor and the axle, such that the rotor is rotatable about the axle; and
a stator which surrounds the rotor in a circumferential direction and which is arrangeable spaced apart from the rotor, and at least partially fixable, in the adapter device;
a sensor magnet formed on an axle face side, facing away from the adapter device, of the axle; and
a magnetic field sensor formed on a head side, facing toward the axle face side, of he rotor carrier;
wherein the adapter device partially covers at least one of the rotor or the stator.

14. An electric machine for arrangement in a transmission housing, comprising:
an adapter device;
an axle connected to the adapter device; a rotor arranged on the axle;
a bearing device arranged between the rotor and the axle, such that the rotor is rotatable about the axle; and
a stator which surrounds the rotor in a circumferential direction and which is arrangeable spaced apart from the rotor, and at least partially fixable, in the adapter device;
a magnetic field sensor formed on an axle face side, facing away from the adapter device, of the axle; and
a sensor magnet formed on a head side, facing toward the axle face side, of the rotor carrier;
wherein the adapter device partially covers at least one of the rotor or the stator.

\* \* \* \* \*